United States Patent [19]
Leggott et al.

[11] Patent Number: 5,213,831
[45] Date of Patent: May 25, 1993

[54] PROCESSING SYSTEM AND METHOD FOR QUICK-COOKING LEGUMES

[75] Inventors: Merton R. Leggott, Lincoln; Randall A. Baker, Douglas; Rick L. Williams, Lincoln, all of Nebr.

[73] Assignee: Brown's Best Food, Lincoln, Nebr.

[21] Appl. No.: 812,684

[22] Filed: Dec. 23, 1991

Related U.S. Application Data

[63] Continuation-in-part of Ser. No. 695,648, May 6, 1991, Pat. No. 5,151,285.

[51] Int. Cl.⁵ .............................................. A23L 1/00
[52] U.S. Cl. .................................... 426/241; 99/355; 99/357; 426/243; 426/507; 426/634
[58] Field of Search ............... 426/241, 243, 634, 450, 426/507, 518, 523; 99/355, 357; 241/14, 235

[56] References Cited

U.S. PATENT DOCUMENTS

| | | | |
|---|---|---|---|
| 2,600,867 | 6/1952 | Gerritsen | 241/14 |
| 3,694,220 | 9/1972 | Pierce | 426/450 |
| 4,735,816 | 4/1988 | Sterner et al. | 426/634 |

*Primary Examiner*—George Yeung
*Attorney, Agent, or Firm*—Litman, McMahon & Brown

[57] ABSTRACT

A quick-cooking legume producing system includes equipment for receiving, sizing, moisturizing, tempering and precooking legumes. A first roller assembly is located downstream from the cooking equipment and includes a pair of rollers with generally cylindrical outer surfaces having corrugations. A second roller assembly is located downstream from the first roller assembly and includes a pair of rollers with generally cylindrical, smooth outer surfaces. Cooling and storage equipment are provided downstream from the roller assemblies. A quick-cooking legume producing method includes receiving, sizing, moisturizing, tempering, precoooking, fracturing, cooling and storing steps.

22 Claims, 2 Drawing Sheets

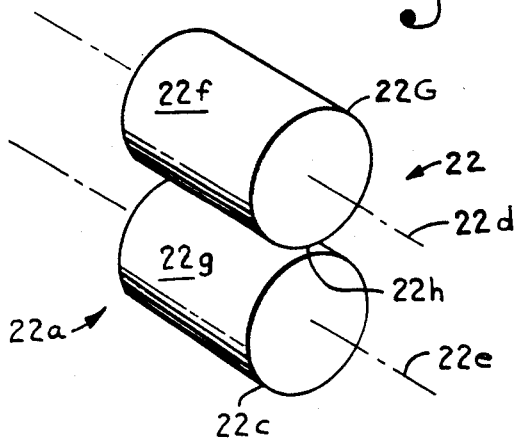
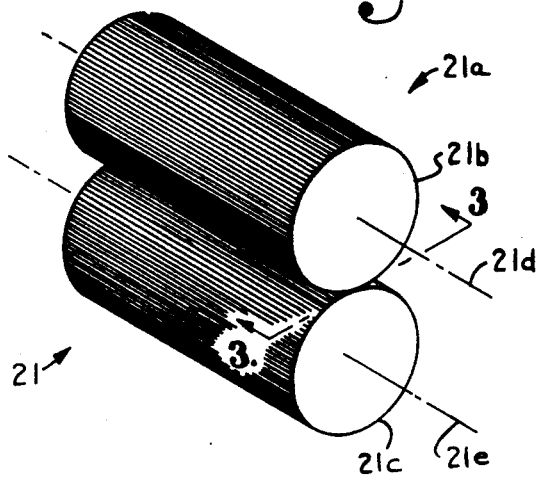
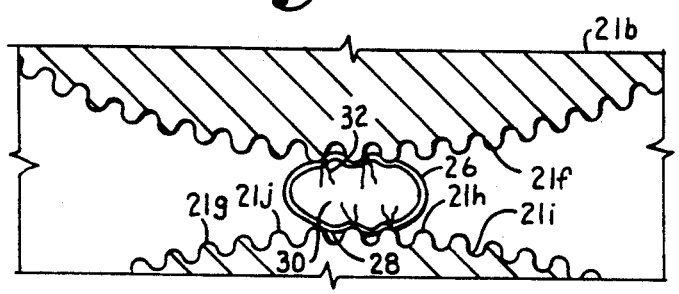

PROCESSING SYSTEM AND METHOD FOR QUICK-COOKING LEGUMES

This application is a Continuation-in-Part of Ser. No. 07/695,648, filed May 6, 1991 for COMESTIBLE PROCESSING SYSTEM AND METHOD, Rick L. Williams et al. inventor, now U.S. Pat. No. 5,151,285.

BACKGROUND OF THE INVENTION

1. Field of the Invention

The present invention relates generally to comestible processing, and in particular to a quick-cooking legume processing system and method.

2. Description of the Related Art

A wide variety of legumes are used as food materials. They includes beans, peas and lentils. Legumes have the advantages of being relatively high in protein, low in fat, and cholesterol-free. Legumes can be grown under various conditions and thus tend to be relatively plentiful and inexpensive. Various cooking procedures and techniques can be utilized with legumes. For example, pressure cooking to legumes is disclosed in the Sterner et al. U.S. Pat. No. 4,735,816 for DEHYDRATED REFRIED BEAN PRODUCT AND METHODS OF MANUFACTURE. Legumes can also be cooked whole, but often require presoaking.

Legumes typically comprise relatively hard, impervious outer seed coats and cotyledons enclosed therein. The outer coats tend to protect the legumes in storage, transport and handling. This self-protecting feature of legumes tends to make them relatively easy and inexpensive to handle without special precautions or equipment. Legumes also have the advantage of being somewhat resistant to spoilage, even when stored at ambient temperatures and exposed to ambient conditions.

However, a disadvantage with legumes is that their protective coats tend to delay thorough cooking since they protect the cotyledons from exposure to cooking conditions. Therefore, legume cooking procedures often involve presoaking to soften the legume coats, or crushing or powderizing procedures which provide a paste-like finished product.

Legume cooking procedures often involve a precooking step or process to expedite the final cook. However, previous legume cooking procedures often involved a number of steps and tended to be somewhat inefficient. The present invention addresses the aforementioned considerations with respect to quick-cooking legumes. Heretofore there has not been available a quick-cooking legume processing system and method with the advantages and features of the present invention.

SUMMARY OF THE INVENTION

In the practice of the present invention, a quick-cooking legume system and method are provided. The system includes means for receiving, sizing, moisturizing, tempering and cooking the legumes. Fracturing means is provided for fracturing the legumes, and comprises a roller assembly with first and second rollers which are rotatably driven about parallel rotational axes. The fracturing means preferably fractures and disrupts the seed coat and the cotyledon whereby the legume is somewhat deformed in the process, but can substantially resume its original appearance when rehydrated, i.e., in the final cook. A first roller assembly has rollers with corrugated or convoluted outer surfaces, and a second roller assembly is located downstream from the first roller assembly with rollers having smooth, cylindrical outer surfaces. Cooling and storing means are located downstream from the fracturing means. The rollers have a gap therebetween which passes the legumes, the legumes being slightly larger than the gap whereby their seed coats and cotyledons are fractured and disrupted as they pass through the roller assemblies. The legume cotyledons are thus disrupted, and the fractures admit moisture or steam in a final cooking process. Receiving, sizing, moisturizing, tempering, cooking, fracturing, cooling and storing steps are provided in the practice of the method of the present invention.

OBJECTS AND ADVANTAGES OF THE INVENTION

The principals and advantages of the present invention include: providing a quick-cooking legume processing system and method; providing such a processing system and method which are adaptable for various legumes; providing such a processing system and method which are adapted for precooking legumes to retard spoilage and to facilitate quick-cooking; providing such a processing system and method which are adapted for fracturing, disrupting and reconfiguring the coats and cotyledons of the legumes to facilitate quick-cooking and rehydration; providing such a processing system and method which utilize infra-red radiation for killing microorganisms in legumes; providing such a processing system and method which utilize rollers for fracturing and deforming legume seed coats and cotyledons; providing such a system and method which are adapted for producing relatively intact quick-cooking legumes; providing such a system and method which are adapted for producing a legume product ready for a final cook with relatively few process steps; and providing such a system and method which are economical to manufacture, efficient in operation, capable of a long operating life, and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a perspective view of a roller assembly comprising legume fracturing means thereof.

FIG. 3 is an enlarged, cross-sectional view of the roller assembly, taken generally along line 3—3 in FIG. 2 and particularly showing the configurations of corrugations at the roller outer surfaces.

FIG. 4 is a perspective view of a roller assembly with rollers having smooth outer surfaces.

DETAILED DESCRIPTION OF THE PREFERRED EMBODIMENTS

I. Introduction and Environment

Figure 1:
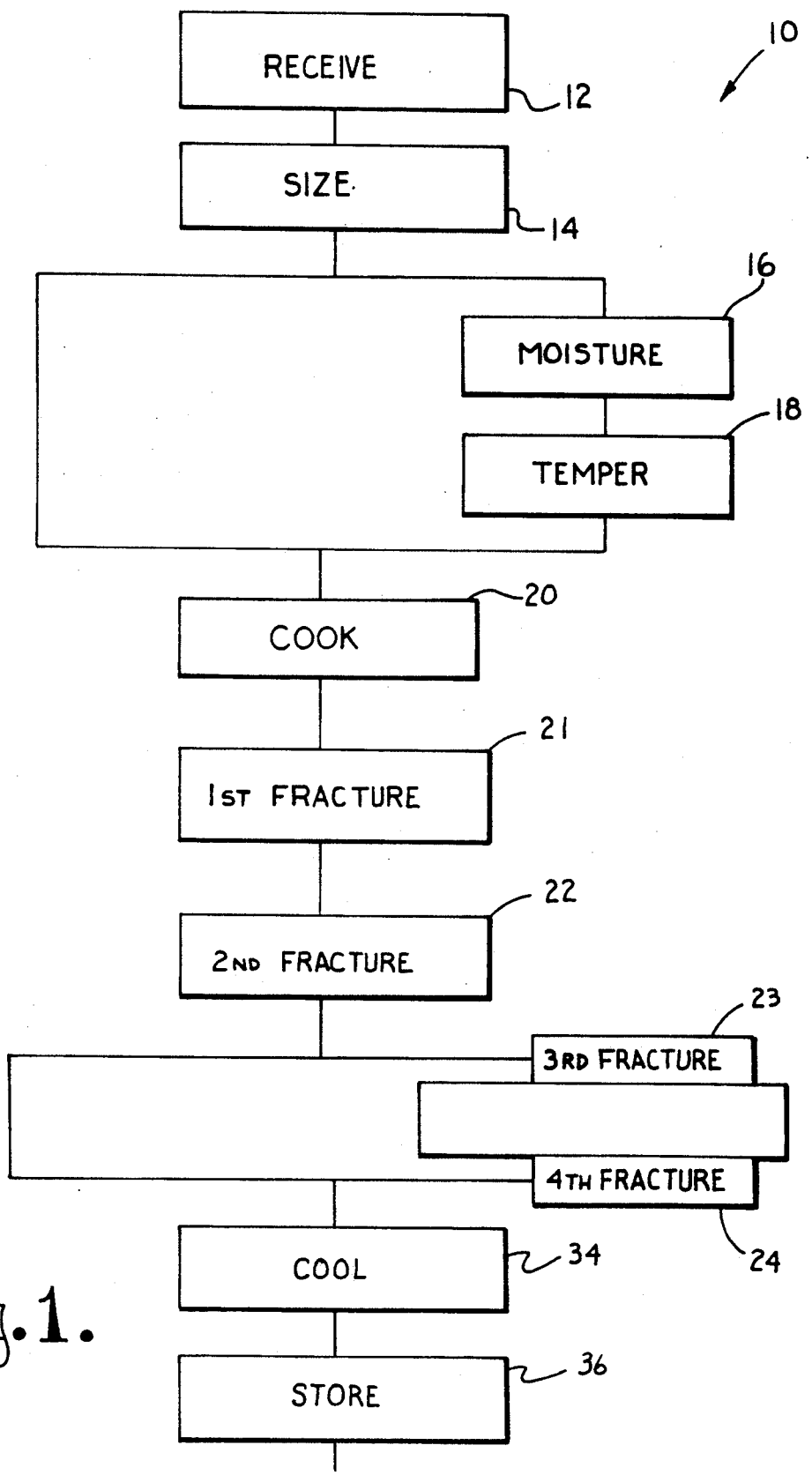
FIG. 1 is a schematic, flowchart diagram of a quick-cooking legume processing system and method embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned derivatives thereof and words of a similar import.

II. Quick-Cooking Legume Processing System And Method

Referring to the drawings in more detail, the reference numeral 10 generally designates a system for processing quick-cooking legumes 26. Without limitation, on the generality of comestible materials that can be processed with the system and method of the present invention, exemplary food materials for processing according to the present invention include legumes such as beans, peas and lentils. Suitable bean varieties, without limitation, include pinto, Great Northern, navy, small red, black, pink, kidney and lima beans.

Receiving means 12 is provided for receiving the legumes, which preferably are clean and/or prewashed and field dried. The legumes received by the receiving means 12 are preferably presorted to remove trash, stones and other inedible foreign matter.

Sizing means 14 is provided for sizing the legumes, and can comprise any suitable equipment. For example, vibrating screens and gravity tables are commonly used for this purpose and are commercially available. The legumes can have various sizes and configurations for processing in accordance with the system and method of the present invention, but preferably relatively close size tolerances are maintained while a particular batch of legumes is being processed. The system 10 can be configured and reconfigured to accommodate legumes of different sizes, but the legumes being processed at any particular time are preferably relatively uniform in size. The sizing means 14 can be selected and configured to maintain such size tolerances.

Moisturizing means 16 is provided for partially hydrating the legumes. Such moisturizing means can operate by spraying the legumes with water or steam. Alternatively, the moisturizing means 16 can include a mixing screw or auger for conveying the legumes through a water-filled vessel or otherwise through a high-humidity environment. Although moisture content ranges will vary considerably depending upon the type of the legume being processed and the nature of the desired finished product, exemplary moisture contents of about 9% to 18% by weight would be fairly typical. The moisturizing step can be omitted if the legumes 26 received by the receiving mean 12 have sufficient moisture content.

Tempering means 18 is provided downstream of the moisturizing means 16 and is adapted for tempering the moisturized legumes 26. The tempering period can vary in accordance with a number of operating parameters. For example, tempering times in the range of about 3 to 24 hours would be appropriate for many types of legumes. The tempering step promotes thorough absorption of moisture accumulated by the legumes 26 in the moisturizing step and facilitates equalizing the moisture content level throughout the legumes 26. The tempering step can be accomplished at ambient temperature. For example, the legumes 26 can be placed in a bin for tempering. Alternatively, they can be collected in a container such as a bag as they exit the moisturizing means 16. Bags of legumes 26 can be collected for the tempering period and then reintroduced into the system 10. The tempering step can be omitted if the legumes received into the system 10 have sufficient moisture contents, with the moisture contents being distributed throughout relatively uniformly.

Cooking means 20 is provided downstream from the tempering means 18 (or downstream from the sizing means 14 if the moisturizing and tempering means 16, 18 are omitted). The cooking means 20 preferably utilizes high intensity, infrared radiation for a relatively short duration (e.g., about 60 to 90 seconds) for raising the product temperature to a temperature in the range of about 220° F. to 280° F. The Leggott et al. and U.S. Pat. No. 5,024,145 discloses a Vibratory Bulk Material Processor which can be utilized as the cooking means 20, and is incorporated herein by references. However, other types of cooking means can be employed with the system 10 of the present invention.

A first fracturing means 21 is located downstream from the cooking means 20 and comprises a roller assembly 21a with first and second rollers 21b, 21c. The rollers 21b, 21c have generally parallel rotational axes 21d, 21e respectively. The first and second rollers 21b, 21c have first and second outer surfaces 21f, 21g respectively with generally cylindrical overall configurations coaxially aligned with the rotational axes 21d, 21e respectively.

Each roller outer surface 21f, 21g includes a plurality of juxtaposed, longitudinally-extending, rounded, alternating lands and grooves 21h, 21i respectively. The configuration of the alternating lands 21h and grooves 21i can comprise a "Stevens" groove corrugation configuration. As shown in FIG. 3, in cross-section, the lands 21h and the grooves 21i form the general configuration of a sin wave.

The lands and grooves 21h, 21i are rounded in cross-sectional configuration to compress the legumes 26 without causing undue damage or cutting. A gap 21j is formed between the roller surfaces 21f, 21g. The gap 21j is bounded by the alternating lands and grooves 21h, 21i of the roller outer surfaces 21f, 21g. The spacing between the rollers 21b, 21c can be adjustable to vary the gap 21j whereby different sizes of legumes can be accommodated. At least one, and preferably both, of the rollers 21b, 21c are driven.

When a legume 26 passes through the roller gap 21j, the roller lands and grooves 21h, 21i compress a seed coat 28 and a cotyledon 30 of the legume 26. The force exerted on the seed coat 28 and the cotyledon 30 cause fractures or fissures 32 which open outwardly at the seed coat 28 and penetrate into the cotyledon 30. The cotyledon 30 is thus disrupted and its structure is reoriented.

The legumes 26 preferably enter the first coat-fracturing means 21 immediately upon discharge from the cooking means 20. The legumes 26 are thus preferably fractured and rolled while still retaining most of the heat absorbed in the cooking step. Steam and excess heat are thus flashed off of the legumes 26 and permitted to escape through the fissures 32 therein.

A second fracturing means 22 is provided downstream from the first fracturing means 21. The second fracturing means 22 also includes a roller subassembly 22a with a pair of driven cylindrical rollers 22b, 22c with generally parallel, spaced rotational axes 22d, 22e. The rollers 22b, 22c have generally cylindrical, smooth outer surfaces 22f, 22g which form a generally rectangular gap 22h therebetween. The gap spacing 22h can be adjustable, and preferably is less than a minimum cross-sectional dimension of the legumes 26 when they reach the second fracturing means 22. Thus, the second fracturing means 22 further fractures and disrupts the coat and cotyledon 28, 30 of the legume 26.

The system 10 can include third and fourth fracturing means 23, 24 respectively. The fracturing means 21-24 can include rollers with various combinations of surface configurations, e.g., corrugated and smooth. The roller surface configurations effect the characteristics of the finished product, and a virtually unlimited number of roller configuration combinations can be assembled within the scope of the present invention. Additional fracturing means can also be provided downstream of the fracturing means 21-24, or as alternative steps or branches to the process executed with the system 10. A single fracturing step can also be employed with the system and method of the present invention.

Cooling means 34 is provided downstream from the fracturing means 21-24. The cooling means 34 can comprise any of various types of commercial cooling equipment designed for such purposes. For example, counterflow coolers are available which draw ambient air through the cooler vessels in a direction opposite to a direction of material flow therethrough. The legumes 26 can be conveyed through the cooling means 34 (which can include a cabinet and fan or blower means for creating an airflow therein) on a woven wire belt which permits airflow passage therethrough.

Storing means 36 is provided downstream from the cooling means 34, and can comprise any suitable storage container or vessel, including the packaging for the finished product.

III. Finished Product Usage

The legumes 26 processed according to the system and method described above are adapted for quick cooking. The legume fissures 32 and the deformed characteristic of the cotyledon 30 facilitate the rehydration and quick cooking of the legumes 26 processed according to the system and method of the present invention. If such materials are cooked in steam or boiling water, inner portions of their cotyledons 30 are reached by the steam or boiling water relatively quickly for thorough through-cooking. Fresoaking of the legumes 26 is generally not required because the fissures 32 thereof facilitate rehydration at a relatively rapid rate, e.g., during the cooking process.

Another advantage of legumes processed according to the system and method of the present invention is that the cooked food products maintain much of the original configuration, taste and mouth feel of the original legumes, particularly as compared with other quick-cooking legume products which are basically crushed or powderized for reconstitution in a paste-type form. For palatability, it is often preferable for the finished product to retain the original legume configuration as much as possible.

The legumes 26 processed according to the system 10 and method of the present invention can be formed into flake or powder configurations by reducing the gaps 21j, 22h therebetween. The roller assembly gaps 21j, 22h can be adjustable to achieve various degrees of fracturing and disruption, ranging from relatively little concentrated at the seed coats 28 to powdering of the legumes 26.

It will be appreciated that with the system 10 and the method of the present invention, legumes can be preprocessed from a raw state to a state ready for a final cooking in relatively few steps and with relatively efficient use of energy. Such efficiencies occur, at least in part, because of benefits of combining the infra-red radiation precooking step with the coat and cotyledon fracturing step while the legumes are still warm.

It is to be understood that while certain forms of the present invention have been illustrated and described herein, it is not to be limited to the specific forms or arrangement of parts described and shown.

What is claimed and desired to be secured by Letters Patent is as follows:

1. A legume processing system, which includes:
   (a) cooking means for precooking said legumes; and
   (b) fracturing means for fracturing the precooked legumes while leaving individual legumes deformed but otherwise substantially intact, thereby producing quick-cooking legumes.
2. The system of claim 1 wherein said fracturing means comprises a roller assembly adapted for fracturing and disrupting legume seed coats and cotyledons.
3. The system of claim 2 wherein said roller assembly includes a pair of rollers each having a rotational axis, said roller rotational axes being substantially parallel.
4. The system of claim 3, wherein each of said rollers has a generally cylindrical configuration with juxtaposed, longitudinally-extending, alternating lands and grooves.
5. The system of claim 4, wherein said roller assembly comprises a first roller assembly and a second roller assembly positioned downstream from said first roller assembly.
6. The system of claim 5 wherein said second roller assembly includes a pair of rollers each having a rotational axis, said roller rotational axes being substantially parallel and said second roller system rollers having substantially smooth cylindrical outer surfaces.
7. The system of claim 1, which further includes: p1 (c) receiving means for receiving legumes.
8. The system of claim 1, which further includes:
   (c) sizing means for sizing said legumes.
9. The system of claim 1, which further includes:
   (c) moisturizing means for moisturizing said legumes.
10. The system of claim 1, which further includes:
    (c) tempering means for tempering said legumes.
11. The system of claim 1, which further includes:

(c) cooling means for cooling said legumes, said cooling means being located downstream from said fracturing means.

12. The system of claim 1, which further includes:
(c) storing means for storing said legumes, said storing means being located downstream for said cooling means.

13. A system for processing legumes which include seed coats and cotyledons, which comprises:
   (a) receiving means for receiving the legumes;
   (b) sizing means for sizing the legumes;
   (c) moisturizing means for moisturizing the legumes;
   (d) tempering means for tempering the legumes;
   (e) infra-red cooking means for irradiating the tempered legumes with infra-red radiation to precook the legumes;
   (f) fracturing means for fracturing the precooked legumes, thereby producing quick-cooking legumes, said fracturing means including a roller assembly with first and second rollers each having a rotational axis, said roller rotational axes being substantially parallel;
   (g) cooling means for cooling the fractured precooked legumes; and
   (h) storing means for storing the cooled legumes.

14. The system of claim 13, wherein said roller assembly comprises a first roller assembly and a second roller assembly located downstream from said first roller assembly and including first and second rollers each having a rotational axis, said second roller assembly roller rotational axes being substantially parallel.

15. The system of claim 14 wherein said first roller assembly rollers have cylindrical outer surfaces with longitudinally-extending, alternating, rounded lands and grooves and said second roller assembly rollers have generally cylindrical, smooth outer surface configurations.

16. A method of processing legumes with outer seed coats and in new cotyledons which comprises the steps of:
   (a) precooking the legumes;
   (b) fracturing the precooked legumes with a roller assembly, said fracturing step including distorting the cotyledons of the legumes while otherwise leaving the legumes substantially intact, thereby producing quick-cooking legumes.

17. The method of claim 16, which includes the additional steps of:
   before precooking the legumes;
     (i) receiving the legumes;
     (ii) sizing the legumes;
     (iii) moisturizing the legumes; and
     (iv) tempering the legumes; and
   after fracturing the cotyledons of the legumes:
   (c) cooling the legumes; and
   (d) storing the legumes.

18. The method of claim 16, wherein said fracturing step also includes further fracturing the legumes with a second roller assembly by passing the legumes therethrough.

19. The method of claim 16, wherein said precooking step includes subjecting said legumes to infra-red radiation.

20. The method of claim 16, wherein said fracturing step includes fracturing said legumes with said legumes at an elevated temperature from said cooking step and flashing steam off of said legumes.

21. The method of claim 16, which includes the additional step of:
   (c) flaking said fractured legumes.

22. The method of claim 16, which includes the additional step of:
   (c) powdering said fractured legumes.

* * * * *